United States Patent
Clark

(10) Patent No.: US 7,808,915 B2
(45) Date of Patent: Oct. 5, 2010

(54) SYSTEM FOR IDENTIFYING AND LOCATING NETWORK PROBLEMS

(75) Inventor: Alan D. Clark, Snellville, GA (US)

(73) Assignee: Telchemy, Inc., Duluth, GA (US)

( * ) Notice: Subject to any disclaimer, the term of this patent is extended or adjusted under 35 U.S.C. 154(b) by 1826 days.

(21) Appl. No.: 10/821,401

(22) Filed: Apr. 9, 2004

(65) Prior Publication Data

US 2004/0225916 A1    Nov. 11, 2004

Related U.S. Application Data

(60) Provisional application No. 60/462,996, filed on Apr. 14, 2003.

(51) Int. Cl.
*H04J 1/16* (2006.01)
(52) U.S. Cl. ........................ 370/242; 370/253
(58) Field of Classification Search ............... 370/229, 370/241, 242, 245, 248, 252, 253; 714/37, 714/48, 715, 732; 709/224
See application file for complete search history.

(56) References Cited

U.S. PATENT DOCUMENTS

| | | | | |
|---|---|---|---|---|
| 5,477,542 A | * | 12/1995 | Takahara et al. | 370/389 |
| 5,666,353 A | * | 9/1997 | Klausmeier et al. | 370/230 |
| 6,327,677 B1 | * | 12/2001 | Garg et al. | 714/37 |
| 6,990,616 B1 | * | 1/2006 | Botton-Dascal et al. | 714/715 |
| 2002/0039371 A1 | * | 4/2002 | Hedayat et al. | 370/516 |
| 2002/0089975 A1 | * | 7/2002 | Vaziri et al. | 370/352 |
| 2003/0225876 A1 | * | 12/2003 | Oliver et al. | 709/224 |
| 2004/0090923 A1 | * | 5/2004 | Kan et al. | 370/252 |

* cited by examiner

*Primary Examiner*—Kwang B Yao
*Assistant Examiner*—Andrew Lai
(74) *Attorney, Agent, or Firm*—Smith, Gambrell & Russell

(57) ABSTRACT

A network monitoring system for packet based multimedia signal transmission systems which identifies network problems that may affect multimedia performance and provides guidance as to the location of such problems within the network.

19 Claims, 7 Drawing Sheets

Descriptive diagram of System for Identifying and Locating Network Problems

Figure 1. Example application of System for Identifying Network Problems

Figure 2. Descriptive diagram of System for Identifying and Locating Network Problems Figure 3. Example Network Delay Trace Figure 4. Block Diagram of Timestamp Analyzer/Classifier

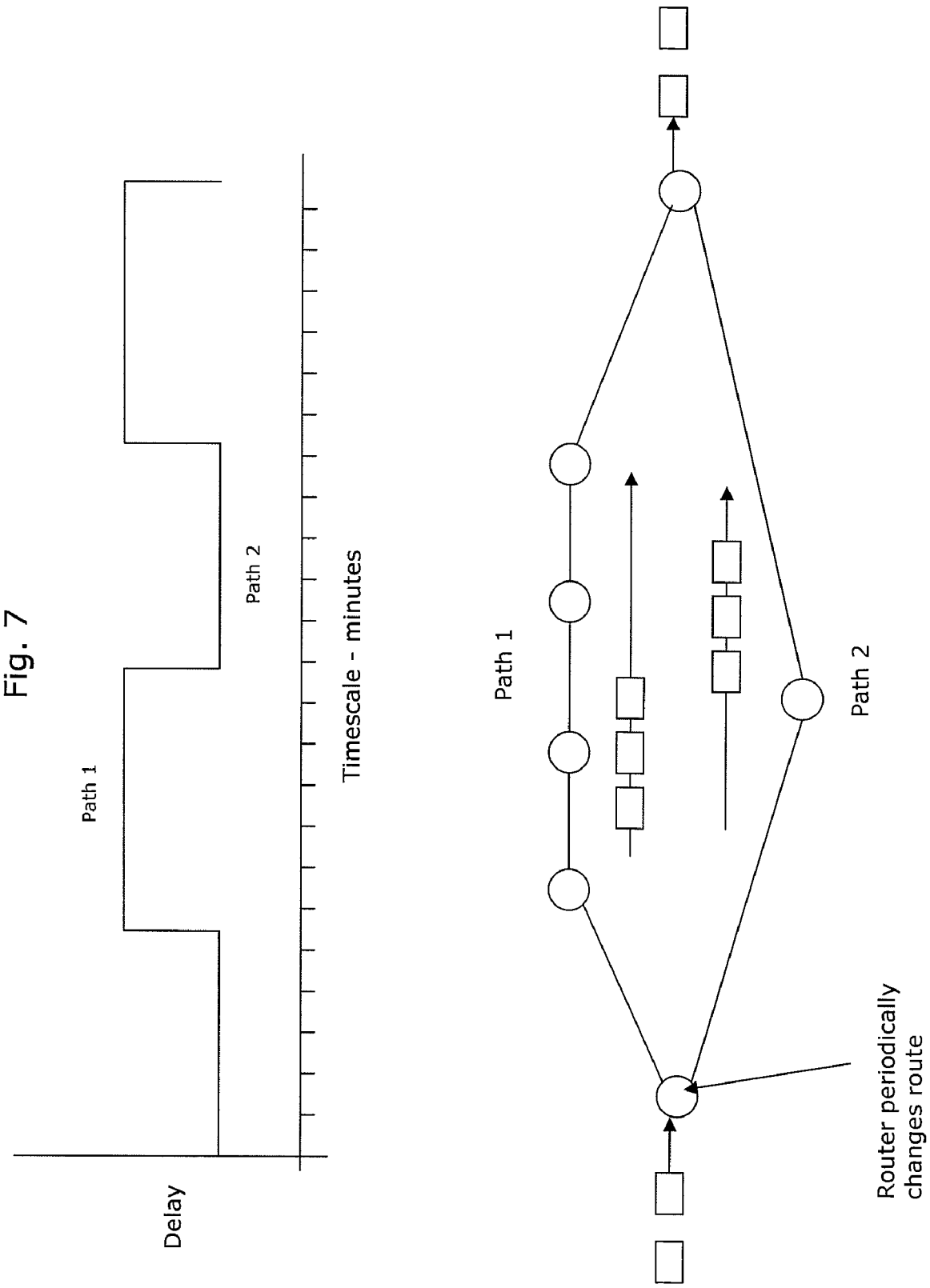

SYSTEM FOR IDENTIFYING AND LOCATING NETWORK PROBLEMS

RELATED APPLICATION

This application claims the benefit of priority of U.S. provisional application No. 60/462,996, filed Apr. 14, 2003, which is incorporated herein by reference.

FIELD OF THE INVENTION

The present invention relates to network monitoring systems. More specifically, the present invention relates to a system that identifies problems in a network environment and provides guidance as to the location of such problems within the network.

BACKGROUND OF THE INVENTION

Packet networks originally intended for the transmission of data are being increasingly used to carry multimedia traffic. Common network problems such as congestion cause noticeable degradation in multimedia performance. It is therefore desirable to have test equipment that, by observing the packet stream at one or more locations, is able to identify network problems so that adequate multimedia performance can be restored.

Packet networks are used to transport data, voice, and video traffic. Common packet network types include Internet Protocol ("IP"), Frame Relay, and Asynchronous Transfer Mode ("ATM"). Each packet contains a payload, which carries data or digitized voice or video, and a header, which comprises a source and destination address and other protocol related information. A packetized multimedia stream is a stream of sequential packets containing successive and contiguous blocks of digitized voice or video.

In general, if one packet of a packetized multimedia stream is lost within the packet network or arrives too late to be used, there will be a corresponding gap in the reconstructed multimedia stream which causes noticeable quality degradation. Accordingly, it is desirable to measure the performance of the packet network and to identify any problems that may cause packets to be lost or delayed. Further, in order to speed the resolution of network problems, it is desirable to identify which of the typical known network problems is the original or root cause of the quality degradation.

The typical problems that cause packets to be lost or delayed include, but are not limited to:
 (i) Congestion, which is due to excessive numbers of packets from other streams causing queues to fill and contention to occur; congestion may occur on Local Area Networks ("LANs"), on the links used to interconnect LANs to packet networks, or within the packet network;
 (ii) Route changes, which are due to the routers or switches within the packet network modifying their decision criteria on which way to route packets; and
 (iii) Link failures, which are often due to the failure of some equipment within the packet network or to a cable being damaged or cut.

Prior art systems for locating network problems require making measurements at different locations within a network so that comparisons can be made. In many cases, packets may pass through networks owned and operated by different entities and hence it may not be possible or practical to make measurements in many locations.

Prior art systems also typically report metrics such as packet loss, jitter, and delay but do not identify the specific nature of the problem. Other prior art systems, such as U.S. Pat. No. 6,327,677 to Garg entitled "Method and Apparatus for Monitoring a Network Environment," perform comparisons of collected data with previously stored historic data in order to report the occurrence of a network problem, but, again, fail to identify the true cause of the problem.

Still other prior art systems employ test packets in order to make measurements, using well known protocols such as Ping and Traceroute. Because these protocols are generally employed to troubleshoot a connection after a problem has been reported, prior art systems using such protocols are not able to detect what occurred on a specific end-to-end connection within the network.

Therefore, a need exists for an improved network monitoring system that identifies network problems, the probable cause of such network problems, and the approximate location of network problems from observations made at one point on the network.

SUMMARY OF THE INVENTION

The present invention answers this need by utilizing the characteristic "signatures" that specific network problems produce in terms of packet loss, jitter, delay, delay variations, distortion, and other measurable impairments. Examples of network problems and their corresponding signatures include:
 (i) Route flapping, in which the route taken by packets may change from one persistent route to another—this results in a step change in delay;
 (ii) Load sharing or route diversity, in which packets are sent by diverse routes—this results in a wide variation in the delay of packets and a significant number of packets arriving out of sequence; and
 (iii) Congestion, in which there is a build-up of traffic—this results in a (typically trapezoidal) increase in delay with a concurrent increase in jitter.

The present invention analyses both short and long term variations in delay and packet loss in order to identify the most likely network problem. The present invention identifies impairments as events based upon the timing and delay change from a known nominal running delay. These events are grouped into "event groups" which are then evaluated against a known problem profile and categorized as being associated with a specific class of network problem. Accordingly, the present invention provides a means for retrospectively classifying events in order to increase accuracy and aid in the identification of those types of network problems, such as route changes, that are difficult to classify from a single observation.

The present invention also provides guidance as to the location of the network problem by examining the calls being monitored via the network interface and using the source identification of these calls to group calls together into logical groups. If, during some measurement interval, the same network impairment is detected only on one group of calls, then the present invention infers that the problem may have occurred on some point common to that group of calls.

Thus, the present invention may be applied to the non-intrusive analysis of Real Time Protocol ("RTP") packet streams that are typically used to transport Voice over IP and video traffic. These packets contain sequence numbers and timestamps and hence obviate the need for test packets.

The present invention may also be applied to a large number of parallel streams. By observing the coincident timing of detected problems on sets of streams the present invention is able to deduce that problems occurred at certain key locations or regions of the network.

Embodiments of the present invention are described below by way of illustration. Other approaches to implementing the present invention and variations of the described embodiments may be constructed by a skilled practitioner and are considered within the scope of the present invention.

BRIEF DESCRIPTION OF THE DRAWINGS

FIG. 7 shows a time-series problem classification diagram illustrating route diversity.

DETAILED DESCRIPTION OF THE INVENTION

Figure 1:
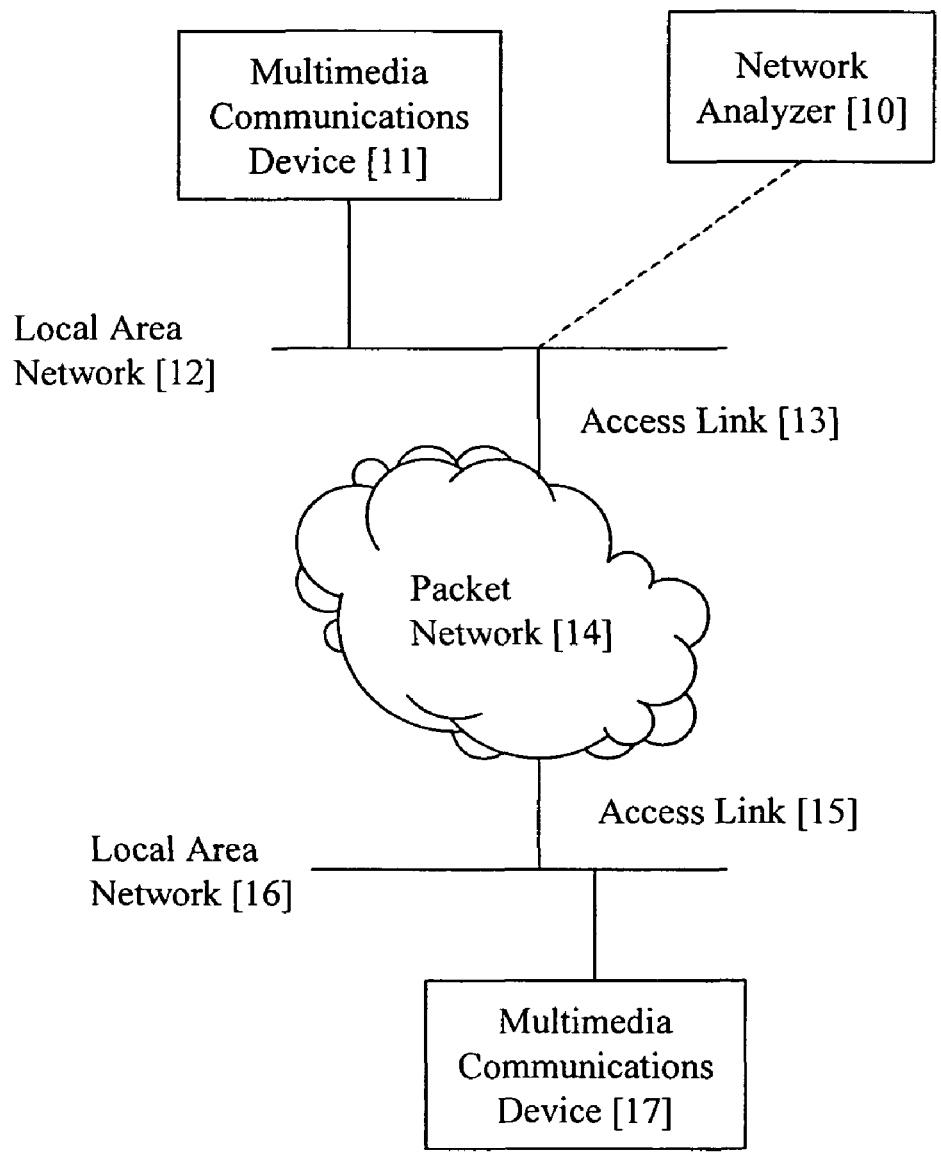
FIG. 1 illustrates a typical packet network and shows local area networks, access links, and a core packet network.

With reference to FIG. 1, a multimedia communications device 11 sends packets at regular intervals through a local area network ("LAN") 12, an access link 13, a core packet network 14, a remote access link 15, and a remote local area network 16 to a remote multimedia communications device 17. Network problems may occur on the LANs 12, 16, the access links 13, 15, or on the core packet network 14. A network analyzer 10 would typically be attached to the local area network 12, 16 or access link 13, 15.

Figure 2:
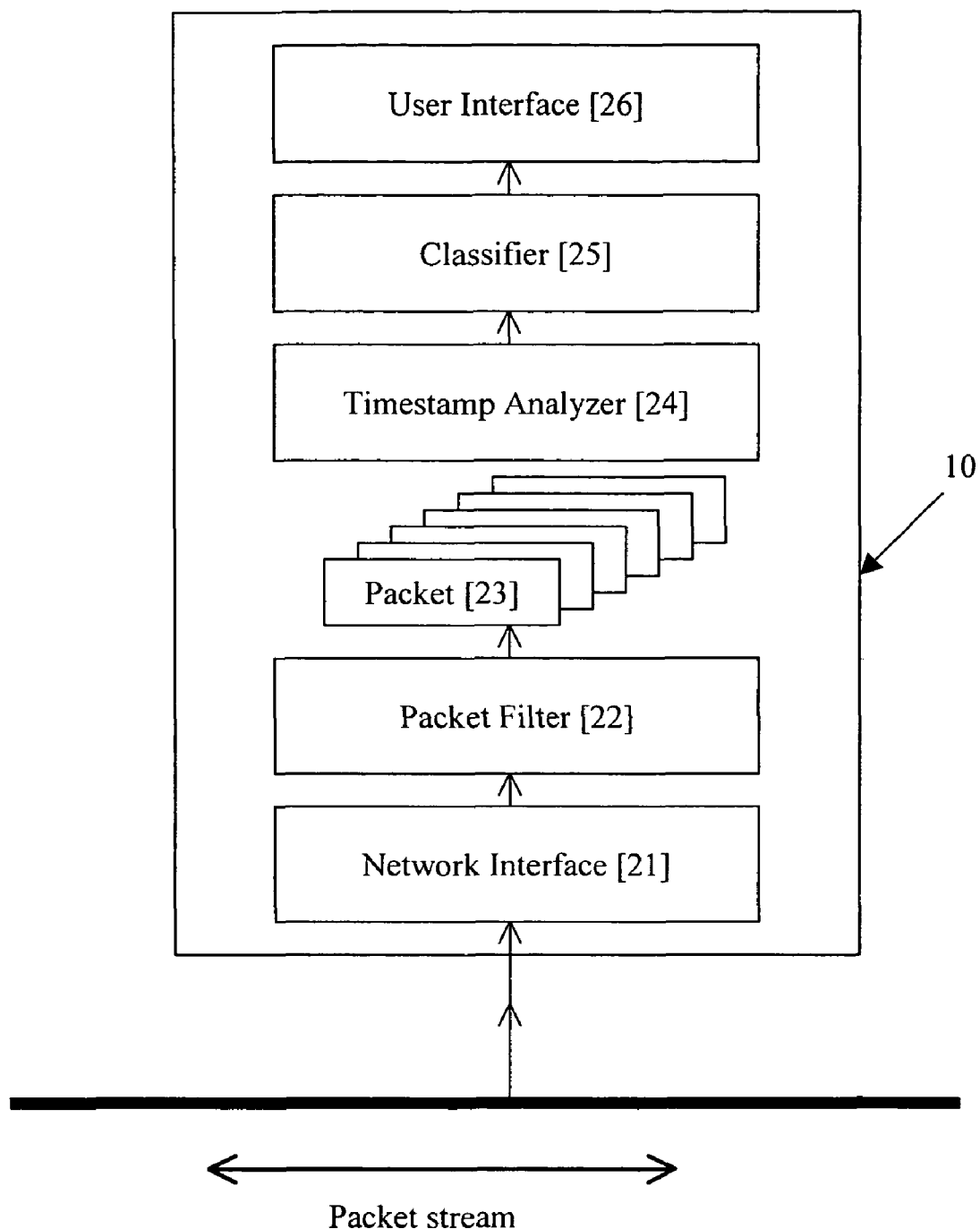
FIG. 2 shows a high level diagram of the present invention.

With reference to FIG. 2, the network analyzer 10 is attached to a communications link through which the packet stream is passing. Packets are captured by a network interface 21 and then passed to a packet filter 22. Time stamped or sequence numbered packets 23 resulting from either multimedia communications or specific test messages such as "pings" are classified by address or other identifier and then delay measurements taken by a timestamp analyzer 24. The resulting delay measurements are summarized and analyzed by a classifier 25 and then reported through a user interface 26.

A set of derived metrics described below is computed on a continuous basis by the timestamp analyzer 25 and the classifier 26 for the set of calls, N, being monitored via the network interface 21. The metric values are sampled at a regular interval, T, such as every one second. This produces a set of arrays of metric values having a number of columns equal to the number of calls and a number of rows equal to the number of sample measurement intervals.

With regard to the derived metrics, for each received packet an estimated absolute packet delay variation ("APDV"), or d, is calculated by comparing the actual arrival time of the packet to its predicted arrival time. The predicted arrival time is determined by observing that the RTP packets used to transport real time traffic have transmit timestamps and sequence numbers, and are transmitted at regular intervals. The predicted arrival time for a packet is calculated by subtracting the transmit timestamp for an earlier reference packet from the transmit timestamp for the current packet, and then adding this time difference to the reference arrival time for the reference packet. If the actual arrival time for the current packet is earlier than the predicted arrival time then the current packet is used as a reference packet and the reference arrival time set to the actual arrival time; this recognizes the basic principle that packet delay comprises a minimum transmission delay plus transient and time varying delays due to congestion.

The relative packet to packet delay variation ("PPDV") of a packet, or r, is calculated by subtracting the actual arrival time of the current packet from the arrival time of the preceding packet to arrive at a delay value for the current packet, then subtracting this delay value from the previously calculated delay value for the preceding packet.

The short term delay variation ("$V_{sav}$") is calculated as a measure of the variation in packet-to-packet delay over a short period of time or for a small number of packets. In the illustrated embodiment, short term delay variation is defined as the running average of absolute r(i), where r(i) is the relative packet to packet delay variation for the (i)th packet with respect to previous packets, with a short time constant of between 8 and 32.

Short term average delay ("$D_{sav}$") is calculated as a measure of the average delay taken over a short period of time. In the illustrated embodiment, short term average delay is defined as the running average of absolute d(i), where d(i) is the delay of the (i)th packet with respect to its expected arrival time, with a short time constant of between 8 and 32.

Timing drift is calculated as a measure of the long term shift in the apparent transmission time of packets with respect to the measurement point's local clock. This is common and is typically in the range of plus or minus 30 microseconds per second. The present invention determines timing drift by identifying those packets which have a minimum delay, subtracting the delay of a newly identified packet from the delay of an earlier identified minimum delay packet, and dividing the subtracted value by the time interval between the identified packets to estimate the rate of change of clock speed. The estimated rate of change of clock speed is then compared to a threshold, typically 100 microseconds per second, and is incorporated into an average rate of change only if its absolute value is less than the threshold. This process eliminates values which incorporate "noise" due to large scale delay variations.

Packet loss ("PL") is calculated as a measure of the proportion of packets lost prior to the measurement point. In the illustrated embodiment, packet loss is expressed as the percentage of lost packets to the sum of lost packets plus received packets.

Proportion of out-of-sequence packets ("$P_{oseq}$") is calculated as a measure of how many arriving packets are not in the same sequence as that in which they were transmitted. In the illustrated embodiment, the proportion of out-of-sequence packets is expressed as a percentage of the total packets received.

Figure 3:
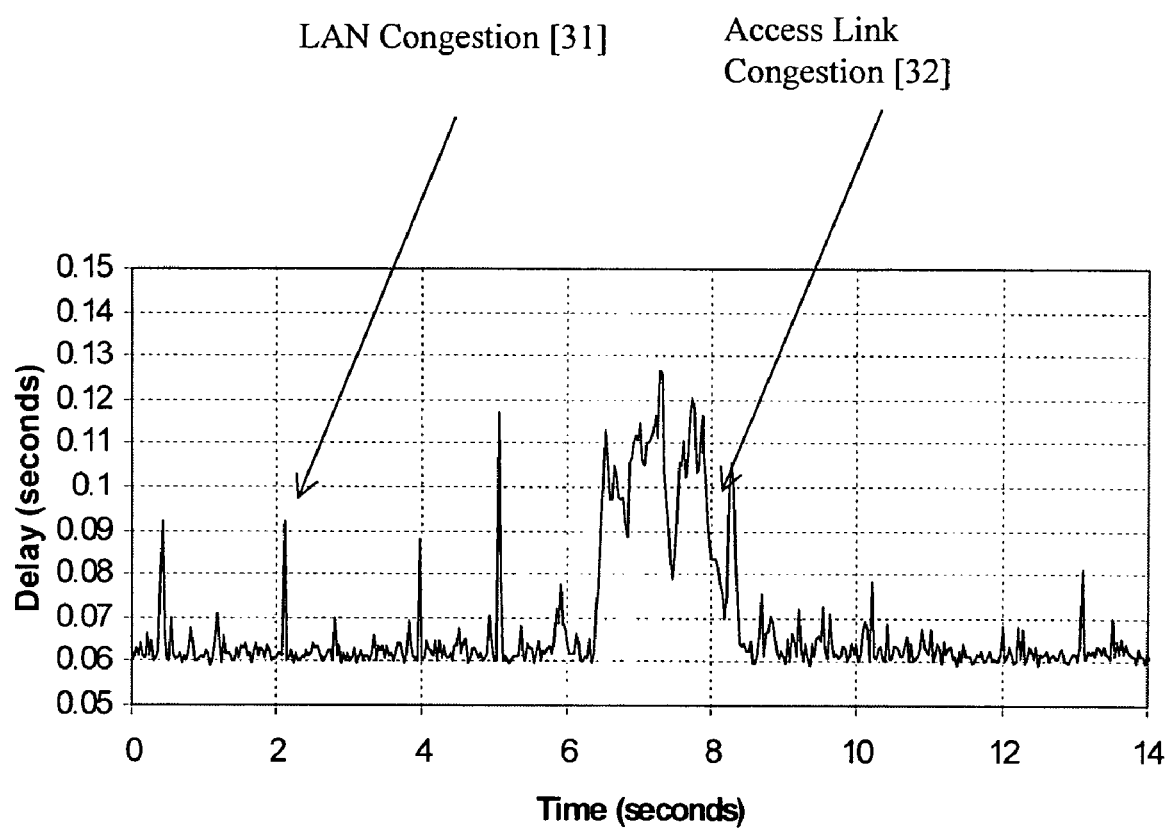
FIG. 3 shows an example of two common types of network impairments.

With reference to FIG. 3, congestion may occur on the LANs 12, 16, on the access links 13, 15 or within the core packet network 14. FIG. 3 shows examples of the typical "signatures" of LAN congestion 31 and access link congestion 32. As shown, LAN congestion 31 results in occasional delayed packets which give a "spiky" signature and access link congestion 32 results in an overall short term increase in delay associated with an increase in delay variation, due to the integrating effect of the queue in the edge router. Similarly, a route change would result in a step-like signature as the delay encountered by all packets following the route change would be similarly increased or decreased.

Figure 4:
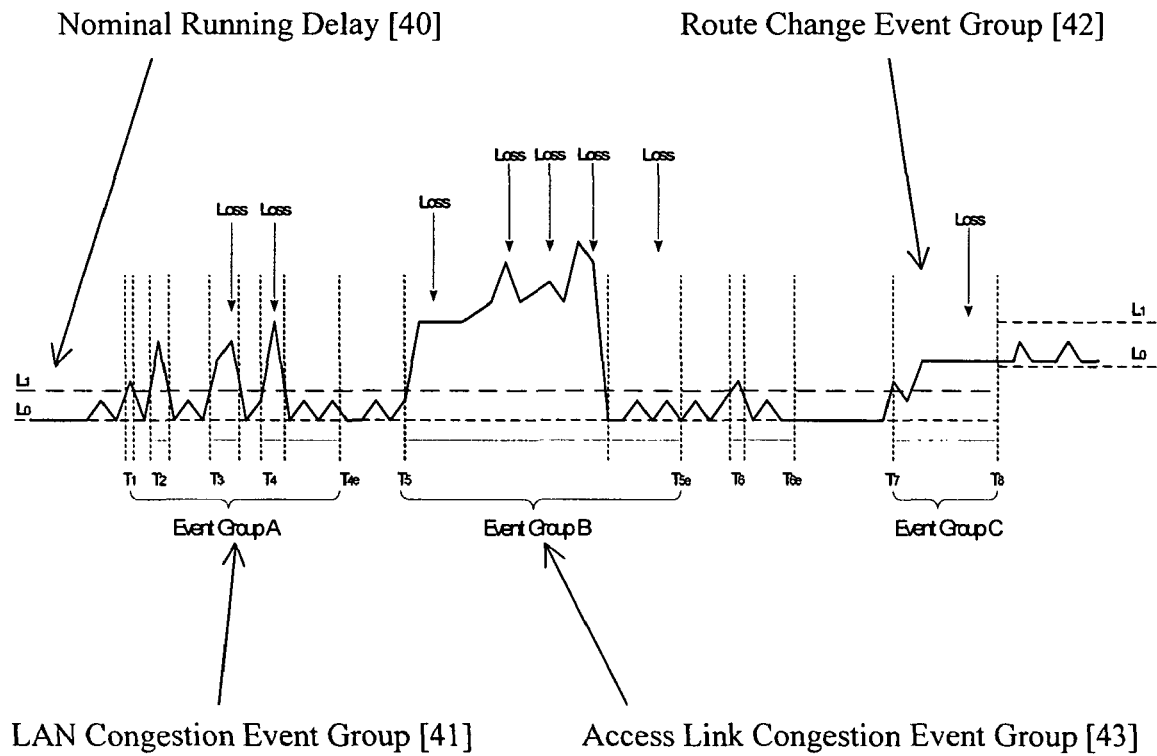
FIG. 4 shows a time-series problem classification diagram of the present invention.
Figure 5:
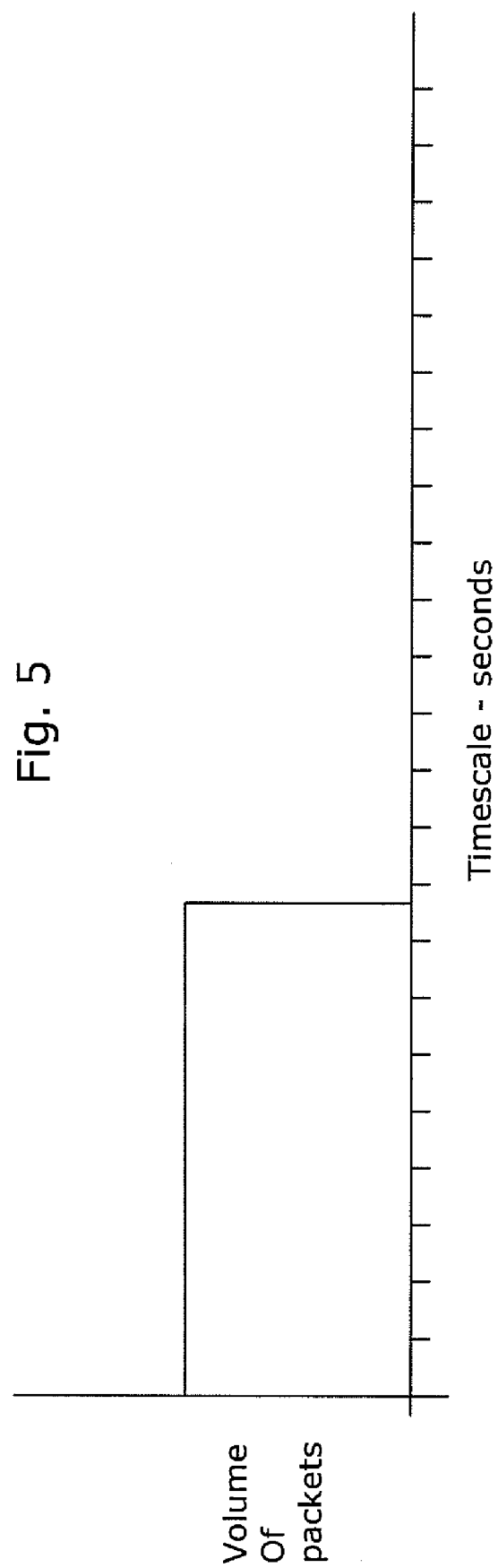
FIG. 5 shows a time-series problem classification diagram illustrating access link failure.
Figure 6:
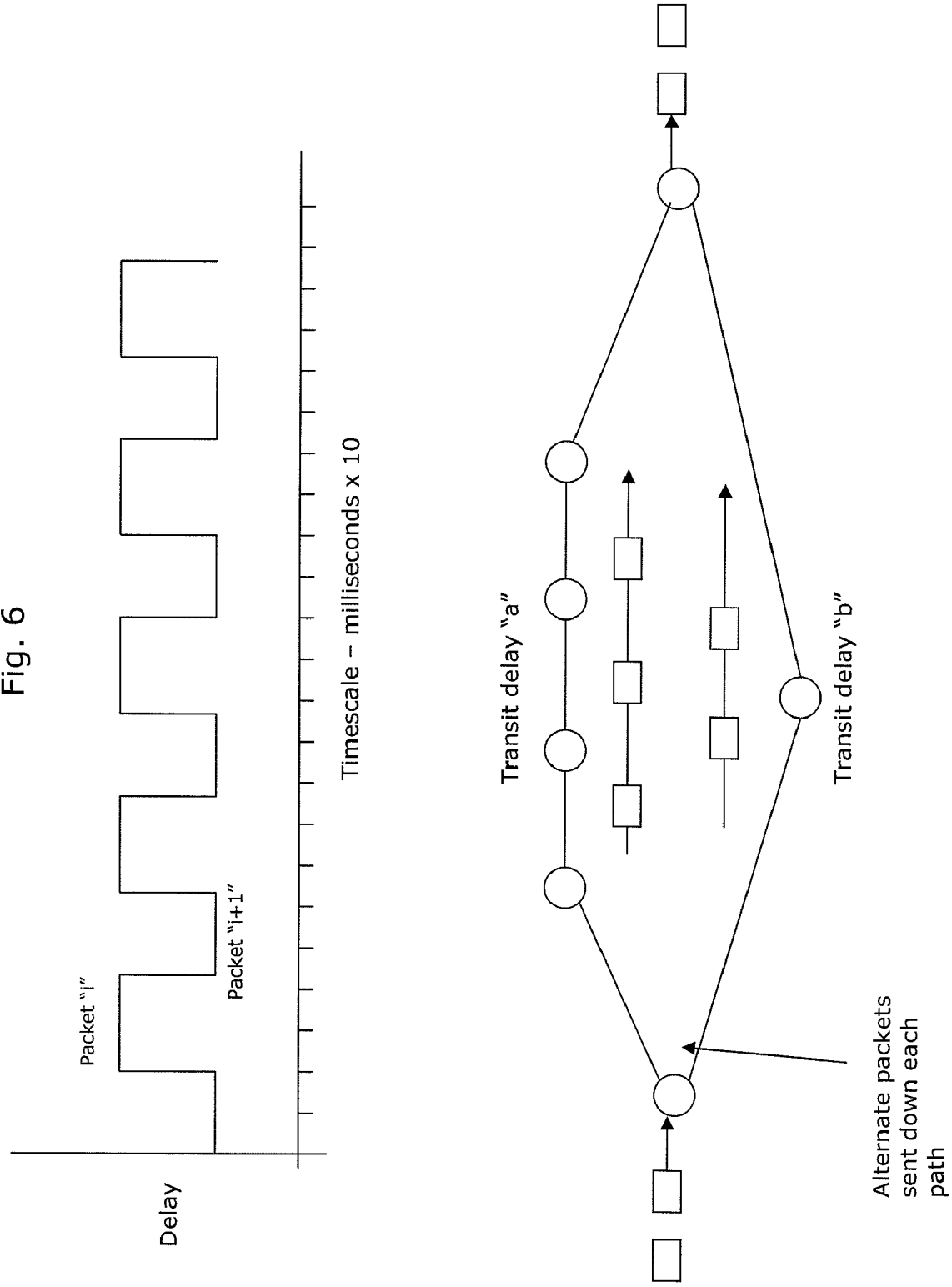
FIG. 6 shows a time-series problem classification diagram illustrating route flapping.

With reference to FIG. 4, proceeding impairment event groups (when evaluated at the end of the process) indicate the actual cause and location of a network problem. Each impairment, such as the occurrence of lost packets, the occurrence of short term delay spikes, the occurrence of step changes in delay, or the occurrence of high values of short term delay variation is identified as an event. An event is based upon the timing and delay change from a known nominal running delay 40. These events are grouped into "event groups" which are then evaluated against a known problem profile and categorized as being associated with a specific class of network problem, for example, a LAN congestion event group 41, an access link congestion event group 43, or a route change event group 42. With these profiles and other associated running parameters, a network problem and location can be derived.

As shown, a LAN congestion event group 41 is characterized by a high value of short term delay variation not accompanied by an increase in delay, and may also suffer from packet loss. An access link congestion event group 43 is characterized by a step or ramp increase in delay accompanied by an increase in short term delay variation, followed by a step or ramp decrease in delay. A route change event group 42 is characterized by a step increase or reduction in delay, with the level of short term delay variation remaining constant.

To illustrate, the present invention notes a delay change at the time it occurs and then re-examines the delay several measurement intervals later. If the delay has returned to its original value, the event would be regarded as part of a congestion event group. However, if the delay maintained the new value, the event would be regarded as a route change event group.

In addition to identifying the particular network problem causing the quality degradation, the present invention provides guidance as to the location of the network problem. The present invention examines some proportion, or all, of the calls monitored via the network interface 21 (FIG. 2). The source identification, such as the source IP address, of these calls is used to group calls together into logical groups. If, during some measurement interval, the same network impairment is detected only on one group of calls, then the present invention infers that the problem may have occurred on some point common to that group of calls. For example, if a problem is detected on all calls being monitored, then the present invention infers that the problem may be occurring in the network close to the observation point.

The present invention is thus able to recognize and locate problems, including those types of network problems, such as access link congestion, which simultaneously affect all the packet streams passing through the point at which the problem occurred. The precise impact on each stream may differ, but because there are expected to be many statistical similarities, the occurrence and location of the problem may be identified.

While there are many other variations on the general approach to identifying network problems described above that could be used and are contemplated within the scope of the present invention, one embodiment is illustrated by the algorithm (method) described below:

For each arriving RTP packet in stream I
Apply a local timestamp $t_L$ to the packet.
Extract a sending timestamp $t_s$ from the packet.
Extract a sending sequence number S from the packet.
Estimate the expected arrival time for the packet.
Subtract the actual arrival time from the expected arrival time.

Determine the short term packet to packet delay variation $V_{sav}(i)$.
Determine the short term average delay $D_{sav}(i)$.
For each measurement interval j
For each call i,
Sample the measured parameters and temporarily store into arrays $V_{sav}j,i$ and $D_{sav}j,i$.
If a delay increase or decrease of greater than some threshold is detected in this measurement interval then check the previous measurement interval to establish if it contained a delay event.
If an immediately prior delay event occurred then identify this as a probable access link congestion event.
Else,
If the previous measurement interval contained a delay change and the level of short term delay variation is low then identify this as a probable route change.
If an increase in short term delay variation is detected without a coincident increase in delay then identify this a probable LAN congestion event.
Examine the identified problem causes for all calls during the present measurement interval.
If the same problem is identified on "most" calls, where "most" is, for example, more than 80 percent of calls, then identify the problem as a local problem.
If the same problem is identified on "most" calls with a common source location then identify the problem as local to the source location.

Accuracy can be improved by correlating different types of impairments. For example, if a route change results in a reduction in delay then it is possible for the last packet before the delay change to overtake the first packet after the delay change. If the reduction in delay occurs because congestion in an access link is reducing, the order of packets will be preserved.

This approach is illustrated in the Visual Basic example shown below:

```
Dim episode(2, 5)
ep _delay = 0
ep _delaychange = 1
ep_jitter = 2
ep _transient = 3
avge = 0
last = 1
this =2
iscale = HScroll1.Value
If Optional. Value = True Then Open "logfile.dat" For Output As #1
dbase = 40 + Int(Rnd(6) * 100)
ddelta = 10
av_short = dbase
av_long = dbase
dscale = 15
jlevel = 20
sw=O
ltav = 4
jj = 200 + Int(Rnd(6) * 200)
toggle = 0
tdrift = 0
tdelta = (Rnd(6) −0.5) / 50
st_pp_abs1 = 1
c1 =0
dmin = 1000
dmax=0
delta sum = 1
delta n = 1
lowest_jitter = 20
Randomize
```

```
For i = 1 To 10000
lastd = d
jj=jj-1
If jj < 0 Then
    If toggle = 0 Then
        jj = 500 + Int(Rnd(6) * 1000)
        ddelta = 10
        jlevel = 5 + 10 * Rnd(6)
        ramp = False
        rampsum = 0
    Else
        If Rnd(6) < 0.3 Then ramp = True Else ramp = False
        If ramp Then
            slope - Rnd(6) - 0.5
            jlevel - 5 + 30* Rnd(6)
        Else
            jlevel = 5 + 10 Rnd(6)
        End if
        rampsum = 0
        rampcount = Int(50 * Rnd(6)) + 5
        jj = 10 + Int(Rnd(6) * 100)
    End if
    toggle = 1 – toggle
End if
tdrift = tdrift + delta
If ramp And rampcount > 0 Then
rampsum = rampsum + slope
End if
If Rnd(6) <0.5 Then
    jitter = 0
Else
Jitter = jlevel * Int(1 + Rnd(6) *4)
End if
D=dbase + ddelta + tdrift + rampsum + jitter
If i<10 Then normal_jitter = jitter_variance
Rem---------------------------------------------------------
st_dl = (st_dl * 7 + d) / 8
jitter_variance = jitter_variance * 31 + Abs(d –st_dl)) / 32
episode(this, epjitter) = jitter_variance
j = j + 1
dmin = (dmin * 15 + d) /16
If d < dmin Then
dmin=d
episode(this, ep_delay) = (episode(this, ep_delay) * 7 + dmin) / 8
If j > 60 Then
dslope = 0
delta = d –dref
If Abs(delta) < 3 Then
Rem small delay change –assume timing drift
delta sum = delta sum + delta
delta_n = delta_n + j
Else
If delta> 0 Then
dslope = 1
expected_delay = dmin
End If
If delta < 0 Then
    dslope = –1
End If
Rem check for large delay change
If delta> 10 Then
    dslope = 2
End If
If delta < –10 Then
dslope = –2
    End If
End If
dref = d
j=1
    End If
End If
dmax = (dmax * 15 + d) /16
If d > dmax Then dmax = d
If Option 1. Value = True Then Print # I, i, j, d, dmin, dref, delta
Rem detect change of episode
Rem defined as change of conditions for more than 1000 mS
episode(this, ep_delaychange) = episode(this, ep_delay) –
episode(last, ep_delay)
delay_offset = c I * 2 * delta_sum / delta_n
c$=""
jitter_increase = episode(this, epjitter) > 2 * episode(last, epjitter)
If delay_change Or jitter_increase Then
    new_episode = True
End If
    If jitter_variance > 1.5 * episode(avge, ep_jitter) Then
        episode(this, ep_transient) = episode(this, ep_transient) + 1
        PSet (ii, 6000): Print "x"
    End If
    c1 = c1 +1
    If c1 > 50 And new_episode Then
        If episode( avge, ep_delay) = 0 Then
        episode(avge, ep_delay) = episode(this, ep_delay)
        episode(avge, epjitter) = episode(this, ep_jitter)
    Else
        episode(avge, ep_delaychange) = (episode(avge, ep_delaychange) *
        31 + episode(this, ep_delaychange)) /32
        episode(avge, ep_delay) = (episode(avge, ep_delay) * 31 +
        episode(this, ep_delay)) /32
        episode(avge, ep_jitter) = (episode(avge, ep_jitter) * 31 +
        episode(this, ep_jitter))/32
    End If
    delay_ramp = delay_change And (Abs(episode(this,
    ep_delaychange) – episode(last,
    ep_delaychang)) < 10)
    delay_step = delay_change And Not delay_ramp
    jitter_transients = episode(this, ep_transient) > 0
    transient_rate = episode(this, ep_transient) / c1
    high_jitter = episode(this, ep_jitter) > 1.5 * episode(avge, ep_jitter)
    episode(last, ep_delaychange) = episode(this, ep_delaychange)
    episode(last, ep_delay) = episode(this, ep_delay)
    episode(last, ep_jitter) = episode(this, ep_jitter)
    episode(last, ep_transient) = episode( this, ep_transient) / c 1
    episode(this, ep_transient) = 0
    c1 =0
End If
If c1 = 0 Then
c$= ""
If delay_ramp Or (delay_step And highjitter) Then c$ = "acc"
If delay_step And Not highjitter Then c$ = c$ + "rte"
If transient_rate> 0 And Not high jitter And Not delay_change Then
    If transient rate < 0.25 Then
        c$ = c$ + "lan"
    Else
        c$ = c$ + "shr"
    End If
End If
PSet (ii, 6000): Print c$
End If
lastii = ii
ii = i * iscale –(iscale –1) * 1000
Line (lastii, 5000 –lastd * dscale)–(ii, 5000 –d * dscale), QBColor(lO)
lastd = d
Line (lastii, 5000 –lastdmax * dscale)–(ii, 5000 –dmax * dscale)
lastdmax = dmax
Line (lastii, 5000 –lastdmin * dscale)–(ii, 5000 –dmin * dscale)
lastdmin = dmin
PSet (ii, 5000 –st_dl * dscale)
PSet (ii, 6000 –jitter_variance * 4 * dscale), QBColor(IO)
PSet (ii, 6000 –episode(last, epjitter) * 4 * dscale), QBColor(5)
PSet (ii, 6000 –episode(avge, ep_jitter) * 4 * dscale), QBColor(IO)
PSet (ii, 5000 –dref* dscale), QBColor(5)
Rem PSet (ii, 5000), QBColor(5)
Rem PSet (ii, 6000 –delay_variance * 4 * dscale), QBColor(6)
Rem PSet (ii, 6000 –diff * dscale)
Rem PSet (ii, 6000 –5 * dscale)
```

-continued

```
    PSet (ii, 5000 −episode(this, ep_delay) * dscale)
    PSet (ii, 7000 −episode(this, ep_delaychange) * dscale)
    PSet (ii, 8000 −episode(last, ep_delaychange) * dscale)
    Rem PSet (ii, 7000 −c1 * dscale / 4)
    Rem PSet (ii, 7000 −jitter_ratio * 20 * dscale)
    Rem PSet (ii, 7000 −st_sp_abs * 2 * dscale), QBColor(5)
    If delta_n > 1 Then mean_delta = delta_sum / delta_n
    PSet (ii, 5000 −(dbase + i * mean_delta) * dscale)
Next
mean_delta = delta sum / delta n
PSet (0, 0): Print mean_delta, i * mean_delta
Line (0, 5000 −dbase * dscale)−(ii, 5000 −(dbase + i * mean_delta) *
dscale)
If Option1.Value = True Then Close #1
```

Having thus described the invention in detail, it should be apparent that various modifications and changes may be made without departing from the spirit and scope of the present invention. Consequently, these and other modifications are contemplated to be within the spirit and scope of the following claims.

I claim

1. A method for identifying problems in a network environment by a network analyzer operatively connected to a network, the method comprising the steps of:
   a. determining, by said network analyzer, during more than one interval, the level of one or more impairments, wherein determining the level of said one or more impairments includes:
      i. applying a local timestamp to a packet corresponding to the actual arrival time of said packet;
      ii. extracting a sending timestamp from said packet;
      iii. extracting a sending sequence number from said packet;
      iv. estimating an expected arrival time for said packet; and
      v. subtracting the actual arrival time of said packet from the expected arrival time of said packet;
   b. grouping, by said network analyzer, said levels of one or more impairments into one or more event groups;
   c. comparing, by said network analyzer, said one or more event groups with a plurality of problem signatures; and
   d. categorizing, by said network analyzer, at least one of said one or more event groups as being associated with a network problem having one of said plurality of problem signatures;
   wherein said plurality of problem signatures includes:
   a. a high value of short term delay variation without an increase in delay;
   b. an increase in delay accompanied by an increase in short term delay variation followed by a decrease in delay; or
   c. an increase or decrease in delay accompanied by a substantially constant level of short term delay variation;
   wherein said one or more impairments is selected from the group consisting of delay, packet loss, jitter, distortion, absolute packet delay variation, relative packet to packet delay variation, short term delay variation, short term average delay, timing drift, and proportion of out-of-sequence packets; and
   wherein said network problem is selected from the group consisting of local area network congestion, access link congestion, route change, access link failure, route flapping, and route diversity.

2. A method for identifying problems in a network environment by a network analyzer operatively connected to a network, the method comprising the steps of:
   a. determining, by said network analyzer, during more than one interval, the level of one or more impairments, wherein determining the level of said one or more impairments includes:
      i. applying a local timestamp to a packet corresponding to the actual arrival time of said packet;
      ii. extracting a sending timestamp from said packet; extracting a sending sequence number from said packet;
      iv. estimating an expected arrival time for said packet; and
      v. subtracting the actual arrival time of said packet from the expected arrival time of said packet.
   b. grouping, by said network analyzer, said levels of one or more impairments into one or more event groups;
   c. comparing, by said network analyzer, said one or more event groups with a plurality of problem signatures, wherein said comparing step includes:
      i. comparing a change in delay during an interval with a threshold;
      ii. determining the level of short term delay variation during said interval; and
      iii. determining whether a preceding interval contains a delay impairment; and
   d. categorizing, by said network analyzer, at least one of said one or more event groups as being associated with a network problem having one of said plurality of problem signatures;
   wherein said one or more impairments is selected from the group consisting of delay, packet loss, jitter, distortion, absolute packet delay variation, relative packet to packet delay variation, short term delay variation, short term average delay, timing drift, and proportion of out-of-sequence packets; and
   wherein said network problem is selected from the group consisting of local area network congestion, access link congestion, route change, access link failure, route flapping, and route diversity.

3. A method as defined in claim 2, wherein categorizing at least one of said one or more event groups includes:
   a. when said change in delay exceeds said threshold and said preceding interval contains said delay impairment, categorizing said event group as said access link congestion.

4. A method as defined in claim 2, wherein categorizing at least one of said one or more event groups includes:
   a. when said change in delay does not exceed said threshold, said preceding interval contains a delay impairment, and said level of short term delay variation is low, categorizing said event group as said route change.

5. A method as defined in claim 2, wherein categorizing at least one of said one or more event groups includes:
   a. when said change in delay does not exceed said threshold, said preceding interval does not contain a delay impairment, and said level of short term delay variation has increased, categorizing said event group as said local area network congestion.

6. A method for identifying problems in a network environment by a network analyzer operatively connected to a network, the method comprising the steps of:
   a. determining, by said network analyzer, during more than one interval, the level of one or more impairments, wherein said determining step includes:
      i. determining the delay of a first packet;
      ii. determining the delay of a subsequent packet; and
      iii. subtracting the delay of said subsequent packet from the delay of said first packet;

b. grouping, by said network analyzer, said levels of one or more impairments into one or more event groups;

c. comparing, by said network analyzer, said one or more event groups with a plurality of problem signatures; and d. categorizing, by said network analyzer, at least one of said one or more event groups as being associated with a network problem having one of said plurality of problem signatures;

wherein said plurality of problem signatures includes:

a. a high value of short term delay variation without an increase in delay;

b. an increase in delay accompanied by an increase in short term delay variation followed by a decrease in delay; or c. an increase or decrease in delay accompanied by a substantially constant level of short term delay variation; and wherein said one or more impairments is selected from the group consisting of delay, packet loss, jitter, distortion, absolute packet delay variation, relative packet to packet delay variation, short term delay variation, short term average delay, timing drift, and proportion of out-of-sequence packets; and wherein said network problem is selected from the group consisting of local area network congestion, access link congestion, route change, access link failure, route flapping, and route diversity.

7. A method for identifying problems in a network environment by a network analyzer operatively connected to a network, the method comprising the steps of:

a. determining, by said network analyzer, during more than one interval, the level of one or more impairments, wherein said determining step includes:
  i. determining the delay of a first packet;
  ii. determining the delay of a subsequent packet; and
  iii. subtracting the delay of said subsequent packet from the delay of said first packet;

b. grouping, by said network analyzer, said levels of one or more impairments into one or more event groups;

c. comparing, by said network analyzer, said one or more event groups with a plurality of problem signatures, wherein said comparing step includes:
  i. comparing a change in delay during an interval with a threshold;
  ii. determining the level of short term delay variation during said interval; and
  iii. determining whether a preceding interval contains a delay impairment; and d. categorizing, by said network analyzer, at least one of said one or more event groups as being associated with a network problem having one of said plurality of problem signatures;

wherein said one or more impairments is selected from the group consisting of delay, packet loss, jitter, distortion, absolute packet delay variation, relative packet to packet delay variation, short term delay variation, short term average delay, timing drift, and proportion of out-of-sequence packets; and wherein said network problem is selected from the group consisting of local area network congestion, access link congestion, route change, access link failure, route flapping, and route diversity.

8. A method as defined in claim 7, wherein categorizing at least one of said one or more event groups includes:

a. when said change in delay exceeds said threshold and said preceding interval contains said delay impairment, categorizing said event group as said access link congestion.

9. A method as defined in claim 7, wherein categorizing at least one of said one or more event groups includes:

a. when said change in delay does not exceed said threshold, said preceding interval contains a delay impairment, and said level of short term delay variation is low, categorizing said event group as said route change.

10. A method as defined in claim 7, wherein categorizing at least one of said one or more event groups includes:

a. when said change in delay does not exceed said threshold, said preceding interval does not contain a delay impairment, and said level of short term delay variation has increased, categorizing said event group as said local area network congestion.

11. A method for identifying problems in a network environment by a network analyzer operatively connected to a network, the method comprising the steps of:

a. determining, by said network analyzer, during more than one interval, the level of one or more impairments, wherein said determining step includes:
  i. identifying a first packet having a minimum delay,
  ii. subtracting the delay of a second packet from the delay of said packet,
  iii. dividing said subtracted value by the time interval between said first and second packets to estimate the rate of change of clock speed; and
  iv. incorporating said estimated rate of change of clock speed into an average rate of change if said estimated rate of change of clock speed exceeds a threshold;

b. grouping, by said network analyzer, said levels of one or more impairments into one or more event groups;

c. comparing, by said network analyzer, said one or more event groups with a plurality of problem signatures; and d. categorizing, by said network analyzer, at least one of said one or more event groups as being associated with a network problem having one of said plurality of problem signatures;

wherein said one or more impairments is selected from the group consisting of delay, packet loss, jitter, distortion, absolute packet delay variation, relative packet to packet delay variation, short term delay variation, short term average delay, timing drift, and proportion of out-of-sequence packets; and wherein said network problem is selected from the group consisting of local area network congestion, access link congestion, route change, access link failure, route flapping, and route diversity.

12. A method, for identifying problems in a network environment by a network analyzer operatively connected to a network, the method comprising the steps of:

a. determining, by said network analyzer, during more than one interval, the level of one or more impairments;

b. grouping, by said network analyzer, said levels of one or more impairments into one or more event groups;

c. comparing, by said network analyzer, said one or more event groups with a plurality of problem signatures; and d. categorizing, by said network analyzer, at least one of said one or more event groups as being associated with a network problem having one of said plurality of problem signatures;

wherein said plurality of problem signatures includes:

a. a high value of short term delay variation without an increase in delay;

b. an increase in delay accompanied by an increase in short term delay variation followed by a decrease in delay; or c. an increase or decrease in delay accompanied by a substantially constant level of short term delay variation;

wherein said one or more impairments is selected from the group consisting of delay, packet loss, jitter, distortion, absolute packet delay variation, relative packet to packet delay variation, short term delay variation, short term average delay, timing drift, and proportion of out-of-sequence packets; and wherein said network problem is selected from the group consisting of local area network congestion, access link congestion, route change, access link failure, route flapping, and route diversity.

13. A method as defined in claim 12, further comprising the steps of:
 a. determining the source of more than one call;
 b. grouping said more than one calls into one or more call groups based on the source of said more than one calls;
 c. for each call group determining the number of calls having said network problem; and
 d. estimating the location of said network problem based on the number of calls having said network problem.

14. A method as defined in claim 13, wherein determining the source of more than one call includes determining the source internet protocol address of said more than one call.

15. A method as defined in claim 13, wherein said estimating step further comprises:
 a. determining the percentage of calls within said call group having said network problem; and
 b. estimating that the location of said network problem is at the location associated with said call group if the percentage of calls is high.

16. A method for identifying problems in a network environment by a network analyzer operatively connected to a network, the method comprising the steps of:
 a. determining, by said network analyzer, during more than one interval, the level of one or more impairments;
 b. grouping, by said network analyzer, said levels of one or more impairments into one or more event groups;
 c. comparing, by said network analyzer, said one or more event groups with a plurality of problem signatures, wherein said comparing step includes:
  i. comparing a change in delay during an interval with a threshold;
  ii. determining the level of short term delay variation during said interval; and
  iii. determining whether a preceding interval contains a delay impairment; and
 d. categorizing, by said network analyzer, at least one of said one or more event groups as being associated with a network problem having one of said plurality of problem signatures;

wherein said one or more impairments is selected from the group consisting of delay, packet loss, jitter, distortion, absolute packet delay variation, relative packet to packet delay variation, short term delay variation, short term average delay, timing drift, and proportion of out-of-sequence packets; and wherein said network problem is selected from the group consisting of local area network congestion, access link congestion, route change, access link failure, route flapping, and route diversity.

17. A method as defined in claim 16, wherein categorizing at least one of said one or more event groups includes:
 a. when said change in delay exceeds said threshold and said preceding interval contains said delay impairment, categorizing said event group as said access link congestion.

18. A method as defined in claim 16, wherein categorizing at least one of said one or more event groups includes:
 a. when said change in delay does not exceed said threshold, said preceding interval contains a delay impairment, and said level of short term delay variation is low, categorizing said event group as said route change.

19. A method as defined in claim 16, wherein categorizing at least one of said one or more event groups includes:
 a. when said change in delay does not exceed said threshold, said preceding interval does not contain a delay impairment, and said level of short term delay variation has increased, categorizing said event group as said local area network congestion.

* * * * *